United States Patent
Han et al.

(10) Patent No.: US 7,922,381 B2
(45) Date of Patent: *Apr. 12, 2011

(54) TWO-WAY BACKLIGHT ASSEMBLY AND TWO-WAY LIQUID CRYSTAL DISPLAY APPARATUS HAVING THE SAME

(75) Inventors: Byung-Woong Han, Incheon-si (KR); Sang-Hee Lee, Yongin-si (KR); Jae-Kwang Kim, Seoul (KR); Young-Bee Chu, Gyeonggi-do (KR); Kyu-Seok Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 18 days.

This patent is subject to a terminal disclaimer.

(21) Appl. No.: 12/411,440

(22) Filed: Mar. 26, 2009

(65) Prior Publication Data

US 2009/0185103 A1 Jul. 23, 2009

Related U.S. Application Data

(63) Continuation of application No. 11/926,651, filed on Oct. 29, 2007, now Pat. No. 7,527,417, which is a continuation of application No. 11/326,197, filed on Jan. 5, 2006, now Pat. No. 7,290,918, which is a continuation of application No. 10/679,400, filed on Oct. 7, 2003, now Pat. No. 7,001,059.

(30) Foreign Application Priority Data

Jun. 26, 2003 (KR) .................................. 2003-42007

(51) Int. Cl.
*F21V 7/04* (2006.01)
(52) U.S. Cl. .......................... 362/632; 362/616; 362/561
(58) Field of Classification Search .................. 362/632, 362/616, 561, 375, 627, 633, 634; 349/58, 349/64–65
See application file for complete search history.

(56) References Cited

U.S. PATENT DOCUMENTS

| | | | | |
|---|---|---|---|---|
| 4,985,809 | A * | 1/1991 | Matsui et al. | 362/624 |
| 6,741,301 | B2 * | 5/2004 | Tsuji | 349/58 |
| 6,925,313 | B2 * | 8/2005 | Kweon et al. | 455/566 |
| 7,001,059 | B2 * | 2/2006 | Han et al. | 362/616 |
| 7,290,918 | B2 * | 11/2007 | Han et al. | 362/616 |
| 7,527,417 | B2 * | 5/2009 | Han et al. | 362/632 |
| 2003/0234897 | A1 * | 12/2003 | Ozawa | 349/65 |

FOREIGN PATENT DOCUMENTS

| | | |
|---|---|---|
| JP | 11-052140 | 2/1999 |
| KR | 2001-0035369 | 5/2001 |
| KR | 2003-0045888 | 6/2003 |

\* cited by examiner

*Primary Examiner* — Anabel M Ton
(74) *Attorney, Agent, or Firm* — F. Chau & Associates, LLC

(57) ABSTRACT

In a two-way backlight assembly and a two-way LCD apparatus, the two-way backlight assembly provides light emitted from one light source to a first direction where a main LCD panel is placed and to a second direction where a sub LCD panel is placed. Also, a sub mold part for receiving the sub LCD panel comprises a black-colored material so as to prevent reflection of the light. Accordingly, thickness and power consumption of the backlight assembly may be reduced and display quality may be also improved by preventing leakage of the light at ends of the sub LCD panel.

20 Claims, 11 Drawing Sheets

TWO-WAY BACKLIGHT ASSEMBLY AND TWO-WAY LIQUID CRYSTAL DISPLAY APPARATUS HAVING THE SAME

CROSS-REFERENCE TO RELATED APPLICATION

This application is a continuation of U.S. application Ser. No. 11/926,651 filed on Oct. 29, 2007 now U.S. Pat. No. 7,527,417, which is a continuation of U.S. application Ser. No. 11/326,197 filed on Jan. 5, 2006 now U.S. Pat. No. 7,290,918, which is a continuation of U.S. application Ser. No. 10/679,400 filed on Oct. 7, 2003 now U.S. Pat. No. 7,001,059, which claims priority under 35 U.S.C. § 119 to Korean Patent Application No. 2003-42007 filed on Jun. 26, 2003, the disclosures of which are incorporated by reference herein in their entirety.

BACKGROUND OF THE INVENTION

1. Field of the Invention

The present invention relates to a two-way backlight assembly and a two-way liquid crystal display apparatus (LCD) having the same, and more particularly to a two-way backlight assembly capable of displaying an image information in two directions opposite to each other and a two-way LCD apparatus having the same.

2. Description of the Related Art

In general, an LCD apparatus, generally, displays an image using liquid crystal having a light transmittance varied in accordance with an intensity of an electric field.

An LCD apparatus having various characteristics, for example, such as a small size, low power consumption, a high resolution, etc., is widely applied to electronic instruments, for example, such as a notebook computer, a monitor, a mobile communication system and so on.

An LCD apparatus, usually, displays an image in one-way. However, a related technology to an LCD apparatus capable of displaying an image in two-way has been developed.

The LCD apparatus capable of displaying the image in two-way, in general, includes a main LCD panel for displaying a main image, a main backlight assembly for supplying light to the main LCD panel, a sub LCD panel for displaying a sub image and a sub backlight assembly for supplying light to the sub LCD panel.

Each of the main and sub backlight assemblies includes a light source for emitting the light, a light guide plate for changing a path of the light, a reflection plate for reflecting the light, and a receiving container for receiving the light source, light guide plate and reflection plate.

The main and sub backlight assemblies are manufactured as a module separated from each other and coupled to each other while the main and sub backlight assemblies are applied to the LCD apparatus so as to supply the light to the main and sub LCD panels, respectively.

However, when the main and sub backlight assemblies manufactured as the separated module are applied to the LCD apparatus, an entire thickness of the LCD apparatus may increase. Also, since the LCD apparatus has two light sources, two reflection plates and two receiving containers applied to the main and sub backlight assemblies, a power consumption and a cost of manufacture of the LCD apparatus may also increase.

BRIEF SUMMARY OF THE INVENTION

The present invention provides a two-way backlight assembly capable of supplying light in two directions different from each other.

The present invention provides a two-way LCD apparatus having the above two-way backlight assembly.

In one aspect of the invention, a two-way backlight assembly includes a light source generating light, a main mold part receiving the light source and a light guide plate, a light-amount control sheet, a receiving container and sub mold part.

The light guide plate provides the light from the light source to a first exit surface and a second exit surface facing the first exit surface. The light-amount control sheet is disposed on the second exit surface so as to partially reflect or transmit the light from the second exit surface.

The receiving container is combined with the main mold part so as to fix the light-amount control sheet to the main mold part, and it has an opening through which the light is transmitted.

The sub mold part has a size equal to a size of the opening of the receiving container and is coupled to a rear surface of the receiving container. The sub mold part comprises a black-colored and/or a flat material.

The two-way backlight assembly further includes a first optical sheet disposed on the first exit surface so as to improve brightness of the light and a second optical sheet disposed on the opening and fixed by means of the sub mold part.

In another aspect of the invention, a two-way LCD apparatus includes a main backlight assembly, a sub backlight assembly, a main LCD panel assembly and a sub LCD panel assembly.

The main backlight assembly includes a light source generating light, a light guide part guiding the light from the light source to a first direction and a second direction opposite to the first direction, and a main mold part receiving the light source and the light guide part;

The sub backlight assembly is disposed in the second direction. The sub backlight assembly includes a first optical sheet improving optical properties of the light exited to the second direction and a sub mold part fixing the first optical sheet to the main mold part;

The main LCD panel assembly is disposed on the main backlight assembly to display a main image using the light provided from the main backlight assembly.

The sub LCD panel assembly is disposed on the sub backlight assembly to display a sub image using the light provided from the sub backlight assembly.

According to the two-way backlight assembly and the two-way LCD apparatus having same, the two-way LCD apparatus may provide the light to two directions different from each other using only one light source, thereby reducing thickness and power consumption of the backlight assembly.

Also, the LCD apparatus may prevent leakage of the light through the ends of the sub mold part because the sub mold part may comprise the black-colored or/and flat material.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
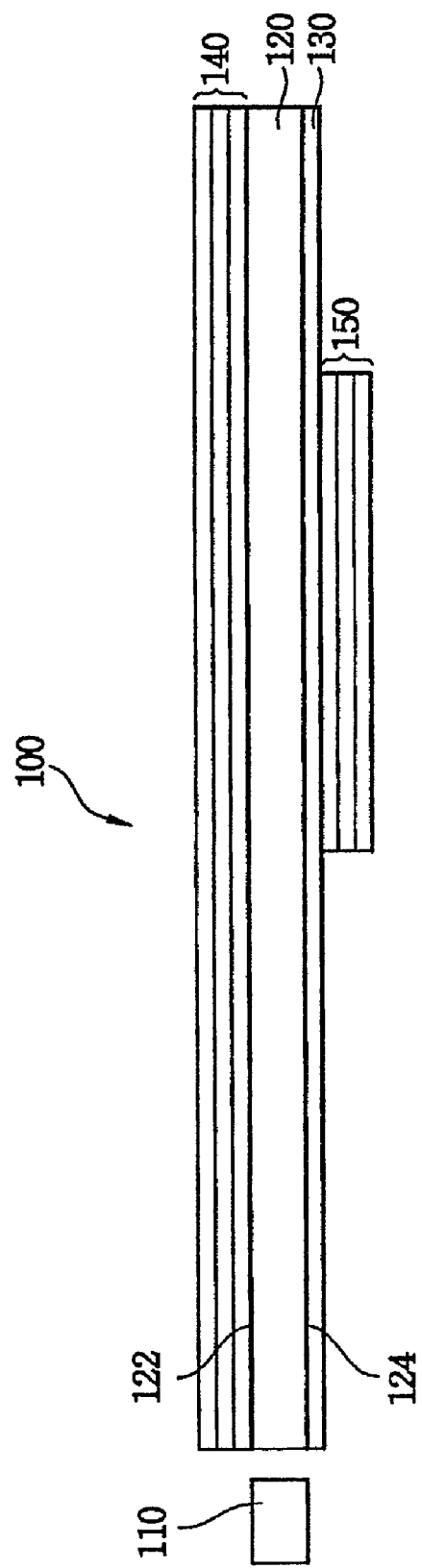
FIG. 1 is a schematic view showing a two-way backlight assembly according to an exemplary embodiment of the present invention.

FIG. 1 is a schematic view showing a two-way backlight assembly according to an exemplary embodiment of the present invention.

Referring to FIG. 1, a two-way backlight assembly 100 includes a light source 110 for generating light, a light guide plate 120 for changing a path of the light, a reflection/transmission sheet 130, a first optical sheet 140 and a second optical sheet 150.

The light guide plate 120 includes a first exit surface 122 and a second exit surface 124 facing the first exit surface 122. The light guide plate 120 receives the light emitted from the light source 110 and outputs the received light through the first and second exit surfaces 122 and 124. That is, the light guide plate 120 changes the light, for example, such as a point light source, a line light source, etc., emitted from the light source into a surface light source to exit the changed light through the first and second exit surfaces 122 and 124.

The reflection/transmission sheet 130 is disposed on the second exit surface 124 of the light guide plate 120. The reflection/transmission sheet 130 reflects a portion of the light exited through the second exit surface 124 to the first exit surface 122 and transmits a remaining portion of the light exited through the second exit surface 124.

The reflection/transmission sheet 130 may have a sheet shape formed by foaming polyethylene terephthalate resin (PET) or a plate shape. By adjusting a thickness of the reflection/transmission sheet 130, an amount of the reflected light from the reflection/transmission sheet 130 to the first exit surface 122 of the light guide plate 120 and an amount of the transmitted light through the reflection/transmission sheet 130 may be adjusted.

In this exemplary embodiment, the reflection/transmission sheet 130 is formed by foaming the PET. However, the reflection/transmission sheet 130 may be formed using any material that partially reflects and transmits the light.

A first optical sheet 140 is disposed on the first exit surface 122 of the light guide plate 120 and a second optical sheet 150 is disposed on the reflection/transmission sheet 130. In order to improve optical properties of the light exited through the first exit surface 122 of the light guide plate 120, the first optical sheet 140 includes a diffusion sheet for diffusing the light from the first exit surface 122 and at least one prism sheet. The second optical sheet 150 also includes a diffusion sheet and at least one prism sheet so as to improve brightness of the light exited through the reflection/transmission sheet 130.

In this exemplary embodiment, the second optical sheet 150 has a smaller size than that of the reflection/transmission sheet 130 and is placed at a center portion of the reflection/transmission sheet 130. The second optical sheet 150 may also have a same size as that of the reflection/transmission sheet 130.

As shown in FIG. 1, although the two-way backlight assembly 100 according to the exemplary embodiment of the present invention includes one light source 110, one light guide plate 120 and one reflection/transmission sheet 130, the two-way backlight assembly 100 may supply the light emitted from the light source 110 to two directions different from each other.

Figure 2:
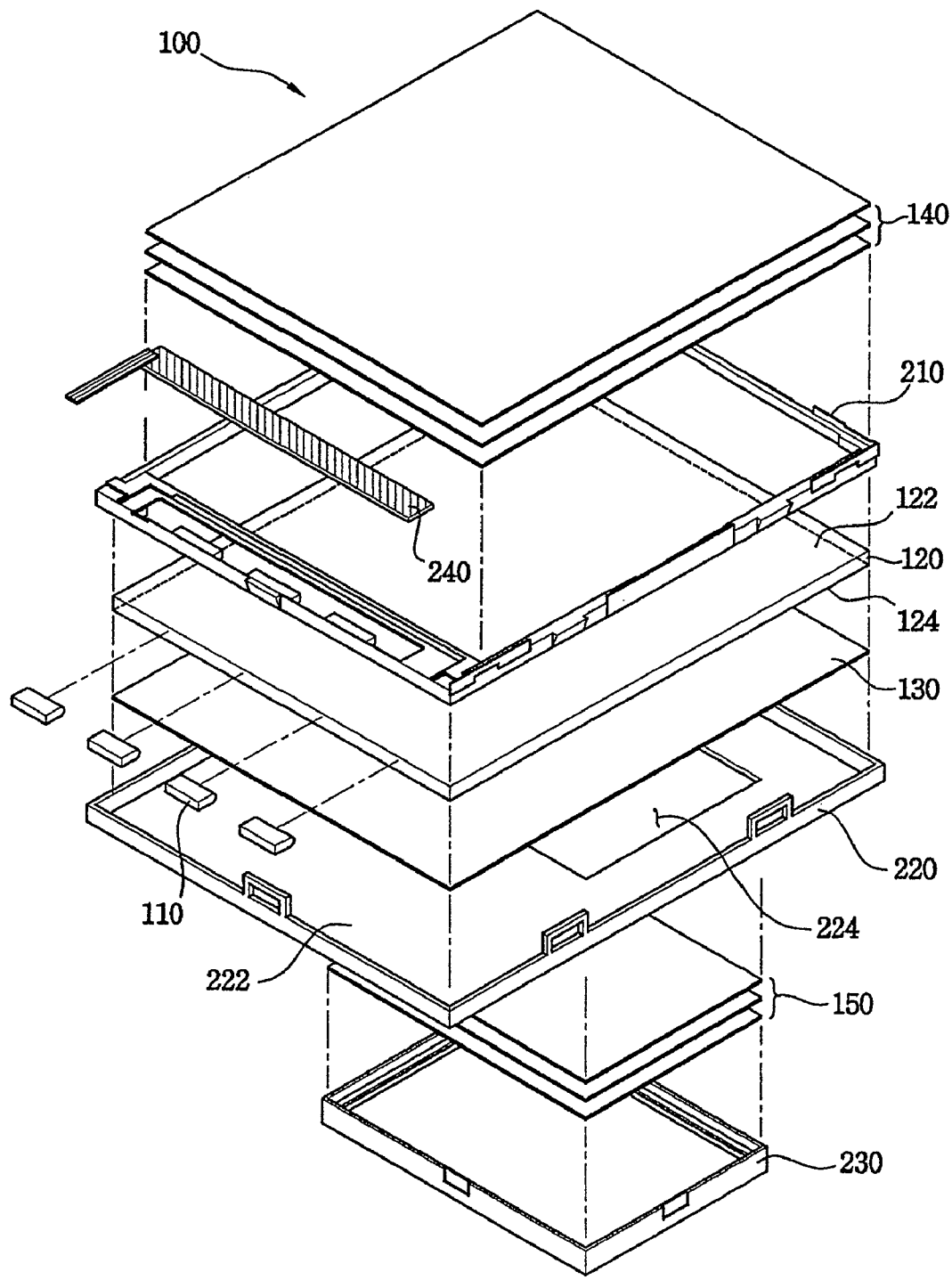
FIG. 2 is an exploded perspective view showing the two-way backlight assembly shown in FIG. 1.

FIG. 2 is an exploded perspective view showing the two-way backlight assembly shown in FIG. 1.

Referring to FIG. 2, the two-way backlight assembly 100 further includes a main mold part 210 for receiving the light source 110 and light guide plate 120, a receiving container 220 for fixing the light guide plate 120 and reflection/transmission sheet 130 to the main mold part 210 and a sub mold part 230 for fixing the second optical sheet 150.

Particularly, the light guide plate 120 and reflection/transmission sheet 130 are successively received into the main mold part 210. The main mold part 210 is combined with the receiving container 220, thereby fixing the light guide plate 120 and reflection/transmission sheet 130 to the main mold part 210. Also, the main mold part 210 further provides a separate receiving space so as to receive the light source 110. When the light source 110 is received into the separate receiving space, a flexible printed circuit board (FPC) 240 is received into the separate receiving space so as to apply a driving power source to the light source 110.

For the light source 110, at least one light emitting diode (LED) or cold cathode fluorescent lamp (CCFL) may be used. The FPC 240 is electrically connected to the light source 110, and applies the driving power source externally provided to the light source 110.

The receiving container 220 is provided with an opening 224 formed at a bottom surface thereof, so that the light from the reflection/transmission sheet 130 may be provided to the second optical sheet 150 through the opening 224. The second optical sheet 150 is outwardly disposed on the opening 224 of the receiving container 220, and the sub mold part 230 is coupled to the opening 224 so as to fix the second optical sheet 150 to the receiving container 220.

As aforementioned above, the two-way backlight assembly 100 may supply two lights in two directions different from each other. One of the two lights is exited through the first exit surface 122 and first optical sheet 140, and it is supplied to a first direction. Another one of the two lights is exited through the second exit surface 124, reflection/transmission sheet 130 and opening 224 and supplied to a second direction opposite to the first direction.

Figure 3:
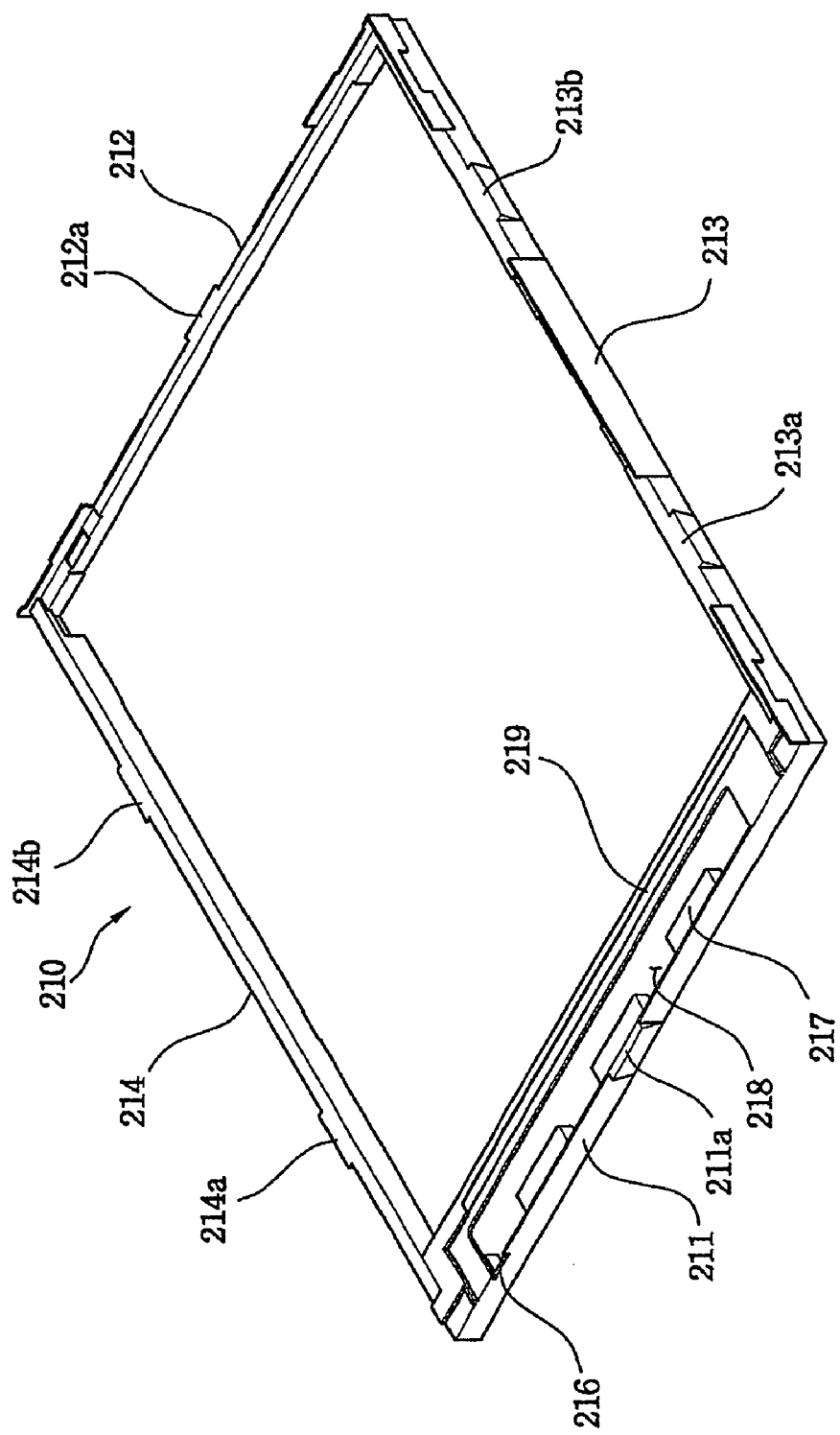
FIG. 3 is a perspective view showing the main mold part shown in FIG. 2.

FIG. 3 is a perspective view showing the main mold part shown in FIG. 2.

Referring to FIG. 3, the main mold part 210 includes first, second, third and fourth sidewalls 211, 212, 213 and 214 and the receiving space. The receiving space formed adjacent to the first sidewall 211 receives the light source 110 and FPC 240. For a steady receiving of the first optical sheet 140, the second sidewall 212 opposite to the first sidewall 211 and the third sidewall 213 connecting between the first and second sidewalls 211 and 212 have a thickness thicker than that of the first and fourth sidewalls 211 and 214.

Hereinafter, the first sidewall 211 of the main mold part 210 will be described in detail.

The first sidewall 211 of the main mold part 210 includes a withdrawn portion 216, a protruded portion 217, a recessed portion 218 and a barrier wall 219.

The withdrawn portion 216 is formed by partially cutting away an upper portion of the first sidewall 211, and has a depth suitable for withdrawing a signal line (not shown) connected to the FPC 240. The signal line outwardly withdrawn through the withdrawn portion 216 provides a driving power source that is externally provided to the FPC 240, and the FPC 240 provides a predetermined power source to the light source 110.

The protruded portion 217 is inwardly protruded from an inner wall of the first sidewall 211 toward the barrier wall 219 to support the FPC 240 disposed thereon. In this exemplary embodiment, the main mold part 210 includes a plurality of protruded portions spaced apart from each other and located at the recessed portion 218, and the light source 110 is disposed between the protruded portions. The protruded portion 217 has a length substantially equal to that of the light source 110.

The recessed portion 218 is formed between the protruded portions so as to receive the light source, for example, such as a light emitting diode or the like.

The barrier wall 219 is spaced apart from the protruded portion 217 in a predetermined distance, and is substantially parallel to the first sidewall 211. The barrier wall 219 supports the FPC 240 disposed thereon, and fixes the light guide plate 120 disposed thereunder.

The main mold part 210 is combined with the receiving container 220 using engaging portions 211a, 212a, 213a, 213b, 214a and 214b formed with first, second, third and fourth sidewalls 211, 212, 213 and 214.

Figure 4:
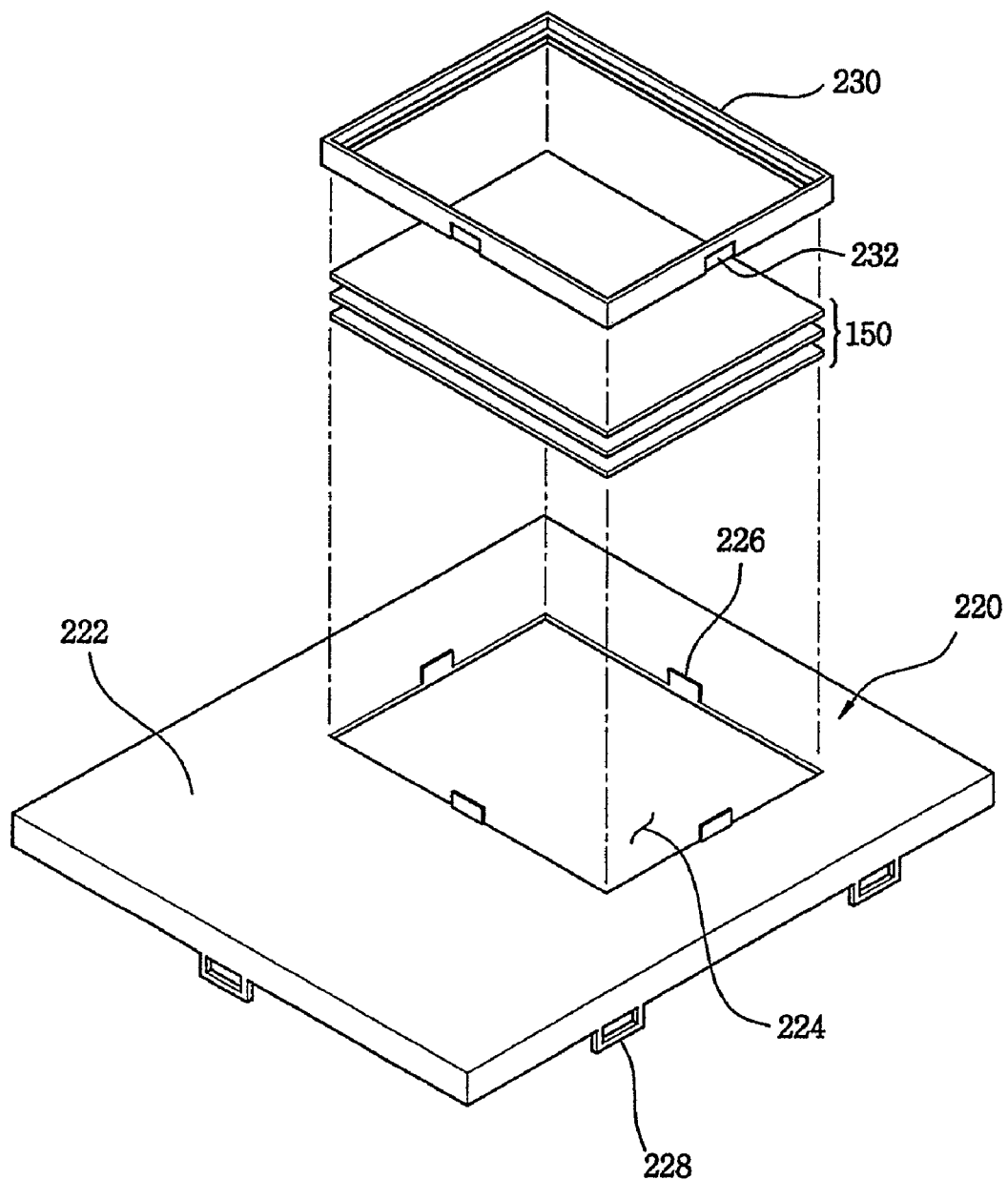
FIG. 4 is a perspective view showing the sub mold part combined with the receiving container shown in FIG. 2.
Figure 5:
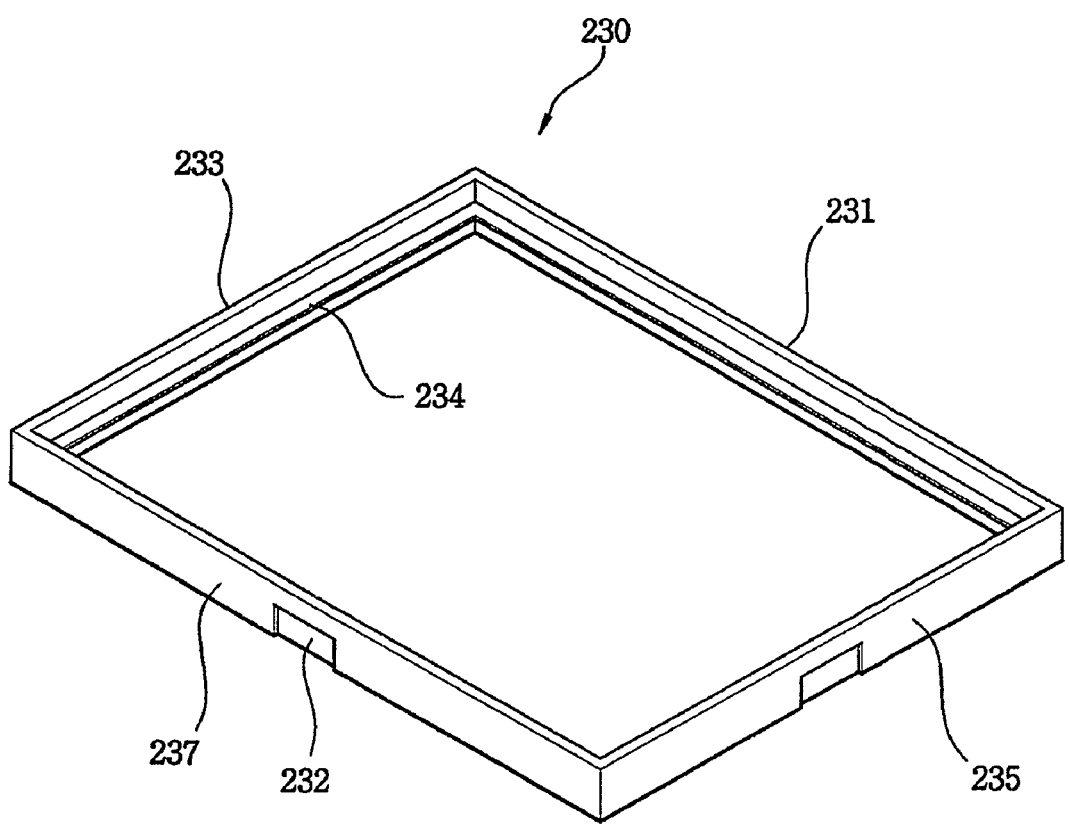
FIG. 5 is a perspective view showing the sub mold part shown in FIG. 5.

FIG. 4 is a perspective view showing the sub mold part combined with the receiving container shown in FIG. 2. FIG. 5 is a perspective view showing the sub mold part shown in FIG. 4.

Referring to FIGS. 4 and 5, the receiving container 220 is provided with the opening 224 formed at the bottom surface thereof, and it is combined with the sub mold part 230 using protrusions 226 formed at ends of the opening 224. Also, the receiving container 220 is provided with engaging members 228 formed at four sidewalls thereof so as to be combined with the main mold part 210. Each of the engaging members 228 is provided with an opening formed by cutting away a center portion thereof.

The openings of the engaging members 228 are engaged to the engaging portions 211a, 212a, 213a, 213b, 214a and 214b, respectively, so that the receiving container 220 is combined with the main mold part 210.

The second optical sheet 150 has a size substantially equal to that of the opening 224 of the receiving container 220, and is disposed at a position corresponding to the opening 224. In this exemplary embodiment, the second optical sheet 150 includes the diffusion sheet and at least one prism sheet so as to improve optical properties of the light exited through the second exit surface 124 and supplied to the second direction.

Particularly, the diffusion sheet diffuses the light provided from the reflection/transmission sheet 130 and outputs through the opening 224 of the receiving container 220 such that the light exited through the opening 224 of the receiving container 220 has a uniform brightness distribution.

In this exemplary embodiment, the prism sheet is disposed on the diffusion sheet and narrows a viewing angle of the light provided from the diffusion sheet, thereby enhancing luminance of the light.

In order to fix the second optical sheet 150 to the opening of the receiving container 220, the sub mold part 230 is combined with the receiving container 220.

The sub mold part 230 has a rectangular-shaped frame having fifth, sixth, seventh and eighth sidewalls 231, 233, 235 and 237. The fourth, sixth, seventh and eighth sidewalls 231, 233, 235 and 237 are provided with engaging recesses 232, respectively to be engaged to the protrusions 226 formed at the ends of the opening 224 of the receiving container 220.

Particularly, the engaging recesses 232 are formed by inwardly recessing outer surfaces of the fifth, sixth, seventh and eighth sidewalls 231, 233, 235 and 237. Thus, when the protrusions 226 of the receiving container 220 are engaged into the engaging recesses 232 of the sub mold part 230 after the second optical sheet 150 is disposed at the position corresponding to the opening 224 of the receiving container 220, the second optical sheet 150 and sub mold part 230 are fixed to the receiving container 220.

The sub mold part 230 further includes a fixing member 234 inwardly formed at the fifth, sixth, seventh and eighth sidewalls 231, 233, 235 and 237 of the sub mold part 230. The fixing member 234 may prevent deviation of the second optical sheet 150 therefrom, and guide a sub LCD panel assembly (not shown).

However, in case that an area through which the light is exited to the first direction is greater than an area through which the light is exited to the second direction, the light exited to the second direction may be leaked through ends of the sub mold part 230. As a result, the backlight assembly 100 according to the exemplary embodiment of the present invention may not provide an image having uniformed brightness.

Figure 6:
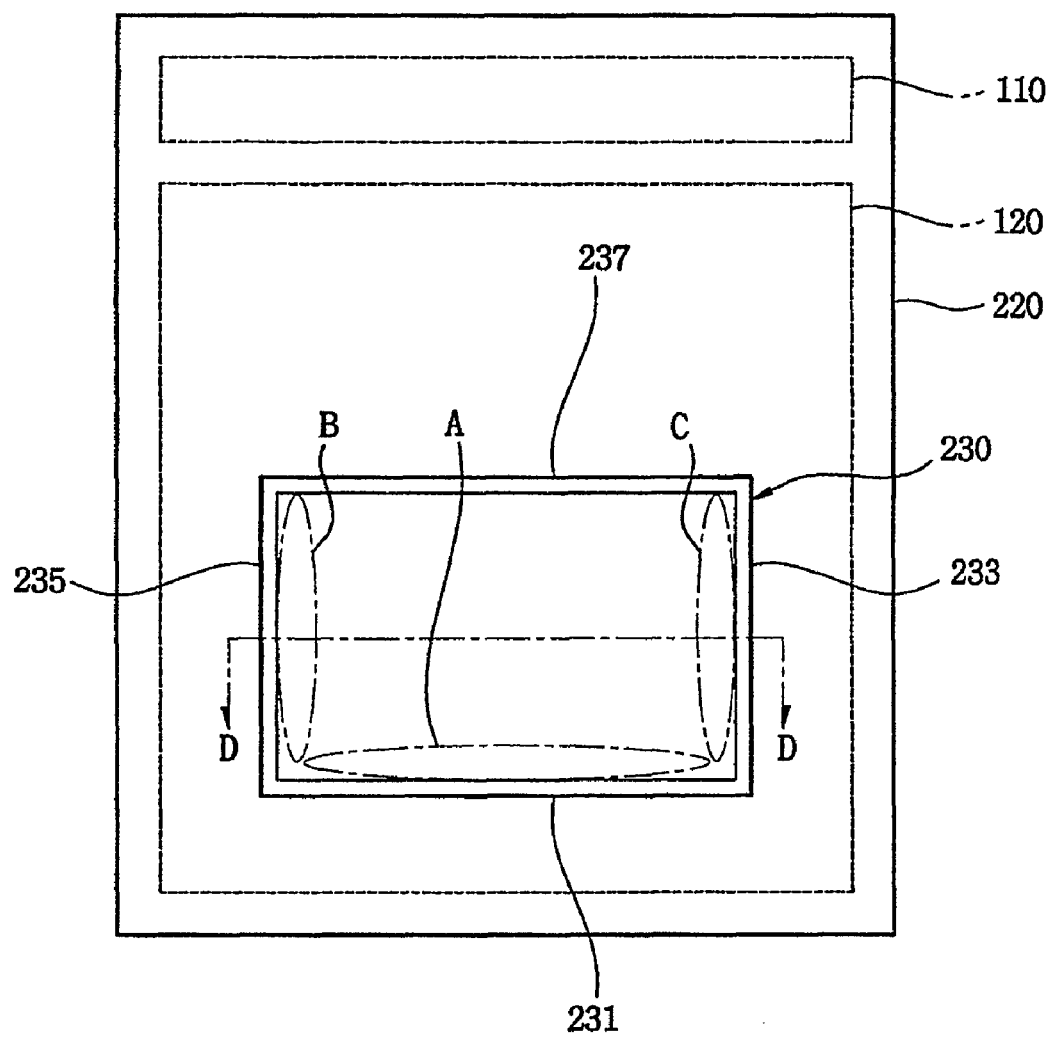
FIG. 6 is a schematic view illustrating a light-leaking phenomenon of the two-way backlight assembly shown in FIG. 2.
Figure 7:
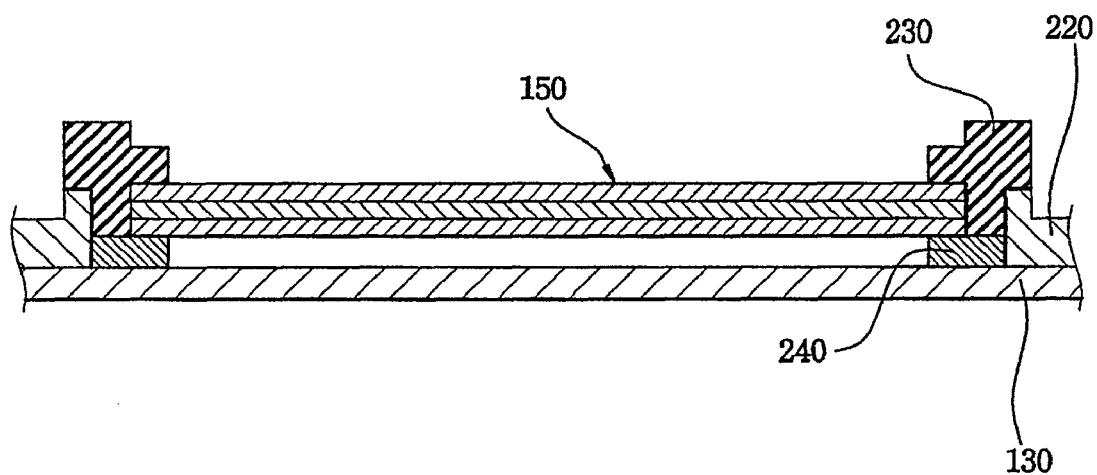
FIG. 7 is a cross-sectional view taken along the line D-D' of FIG. 6.

FIG. 6 is a schematic view illustrating a light-leaking phenomenon of the two-way backlight assembly shown in FIG. 2. FIG. 7 is a cross-sectional view taken along the line D-D' of FIG. 6.

Referring to FIGS. 6 and 7, the sub mold part 230 is installed on the center portion of the receiving container 220 so as to provide the light to the second direction. Thus, the light exited through the second exit surface 124 of the light guide plate 120 is exited through the center portion on which the sub mold part 230 is disposed after transmitting the reflection/transmission sheet 130.

If the sub mold part 230 comprises a white-colored or a glossy material, the light provided to the sub mold part 230 may be reflected from an area "A" adjacent to the fifth sidewall 231 of the sub mold part 230, an area "B" adjacent to the sixth sidewall 233 and an area "C" adjacent to the seventh sidewall 235.

Accordingly, in order to prevent a reflection of the light from the ends of the sub mold part 230, the sub mold part 230 may comprise a black-colored or a flat material.

Also, the two-way backlight assembly 100 may further include a black-colored tape 240 adhered to positions on which the fifth, sixth, seventh and eighth sidewalls 231, 233, 235 and 237 are disposed.

Particularly, the black-colored tape 240 is partially disposed between the reflection/transmission sheet 130 and the fifth, sixth, seventh and eighth sidewalls 231, 233, 235 and 237 of the sub mold part 230. The black-colored tape 240 intercepts a light advancing towards the fifth, sixth, seventh and eighth sidewalls 231, 233, 235 and 237 of the sub mold part 230 among the light exited to the second direction, thereby preventing leakage of the light at the ends of the sub mold part 230.

As described above, the two-way backlight assembly 100 according to the exemplary embodiment of the present invention may supply the light emitted from the light source 110 to two directions different from each other using one light source 110 and one light guide plate 120. In addition, since the sub mold part 230 comprises the black-colored or flat material, the two-way backlight assembly 100 may prevent the leakage of the light at the ends of the sub mold part 230.

Figure 8:
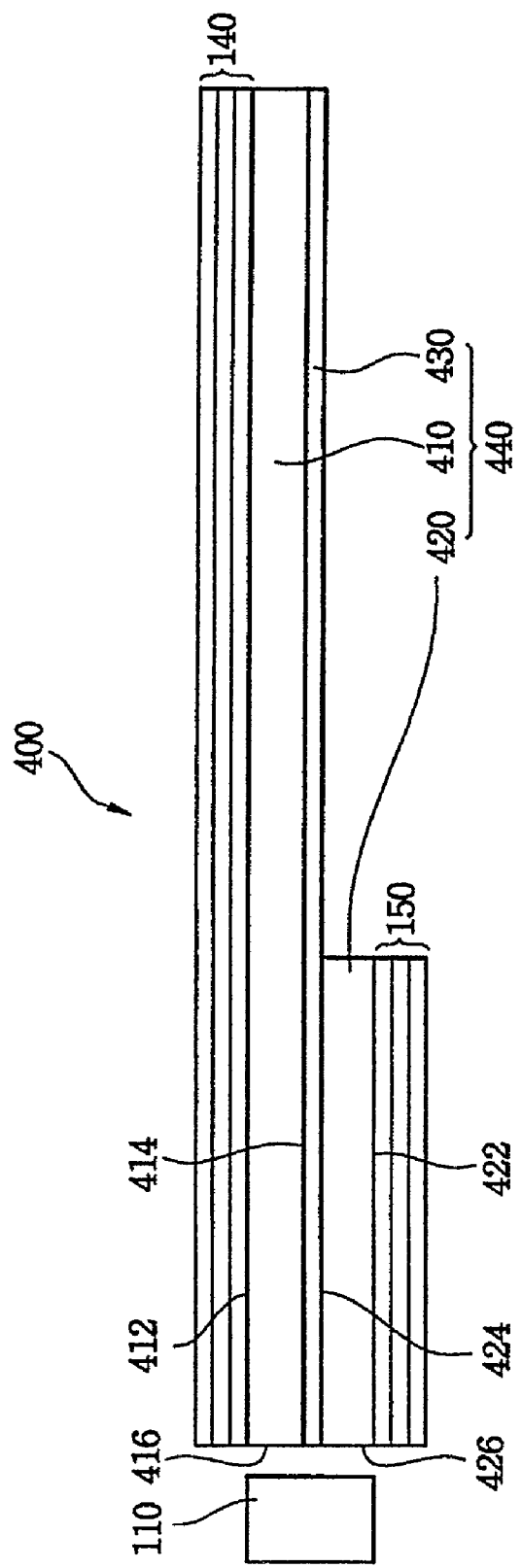
FIG. 8 is a schematic view showing a two-way backlight assembly according to another exemplary embodiment of the present invention.

FIG. 8 is a schematic view showing a two-way backlight assembly according to another exemplary embodiment of the present invention. In FIG. 8, the same reference numerals denote the same elements in FIG. 1, and thus the detailed descriptions of the same elements will be omitted.

Referring to FIG. 8, a backlight assembly 400 according to another exemplary embodiment includes a light source 110, a light guide part 440 for changing a path of the light from the light source 110, a first optical sheet 140 and a second optical sheet 150.

The light guide part 440 includes a first light guide plate 410, a second light guide plate 420, and a reflection plate 430 disposed between the first and second light guide plates 410 and 420.

Particularly, a portion of the light emitted from the light source 110 is incident on the first light guide plate 410 and a remaining portion of the light emitted from the light source 110 is incident on the second light guide plate 420. The first light guide plate 410 includes a first light exit surface 412 facing the first optical sheet 140 and a first light reflection surface 414 facing the reflection plate 430. The second light guide plate 420 also includes a second light exit surface 422 facing the second optical sheet 150 and a second light reflection surface 424 facing the reflection plate 430.

A great portion of the light emitted from the light source 110 and incident on the first light guide plate 410 is directly exited through the first light exit surface 412, and a remaining portion of the light is exited through the first light exit surface 412 after reflecting from the reflection plate 430. Similarly, a great portion of the light emitted from the light source 110 and incident on the second light guide plate 420 is directly exited through the second light exit surface 422, and a remaining portion of the light is exited through the second light exit surface 422 after reflecting from the reflection plate 430.

The second light guide plate 420 may have a size equal to or different from a size of the first light guide plate 410. In this exemplary embodiment, the second light guide plate 420 has a smaller size than that of the first light guide plate 410. Also, an incident surface 426 of the second light guide plate 420, on which the light emitted from the light source 110 is incident, is straight with an incident surface 416 of the first light guide plate 410.

The two-way backlight assembly 100 according to another exemplary embodiment of the present invention may supply the light emitted from the light source 110 to two directions different from each other by using one light source 110, two light guide plates 410 and 420 and one reflection/transmission sheet 430.

Figure 9:
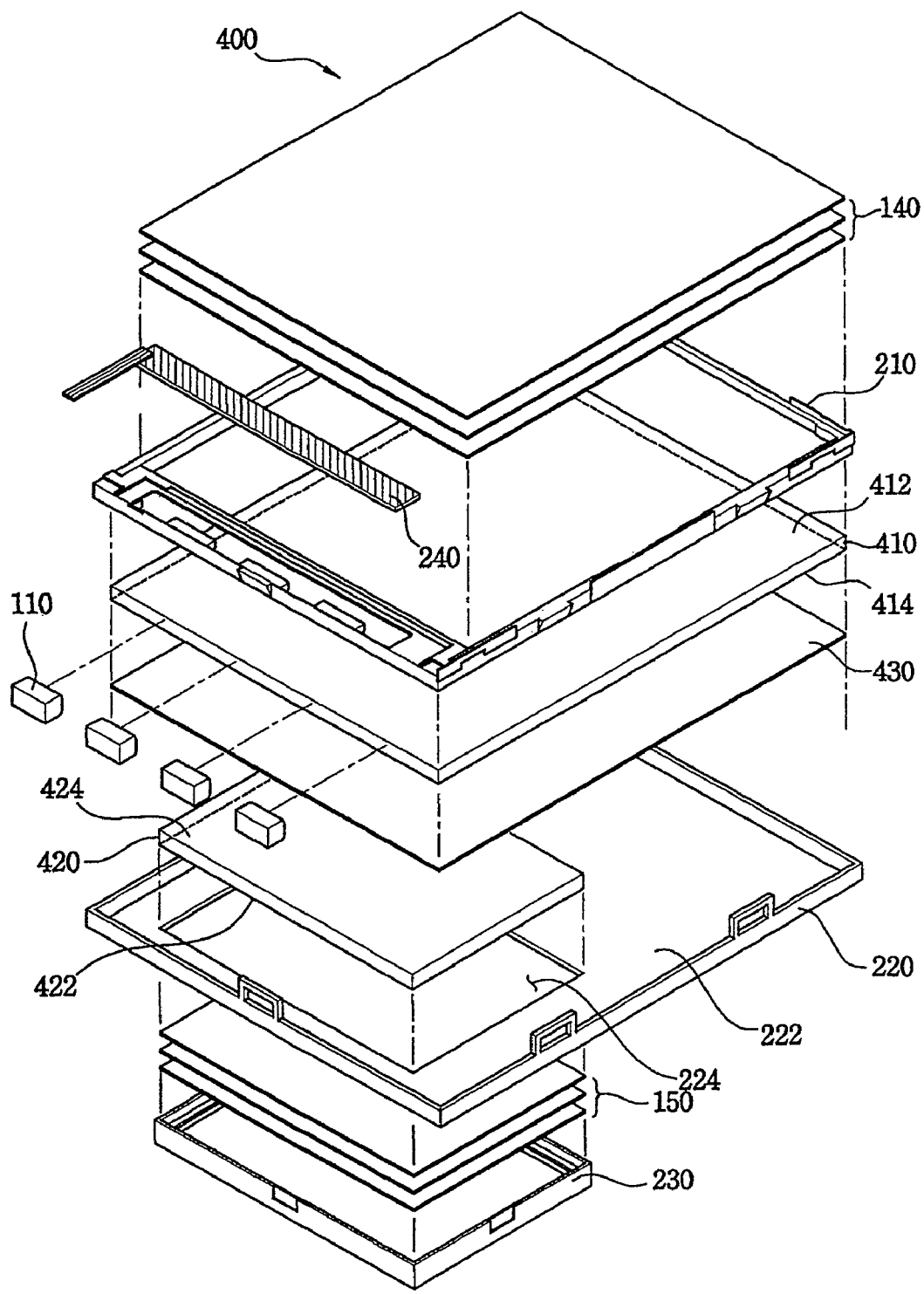
FIG. 9 is an exploded perspective view showing the two-way backlight assembly shown in FIG. 8.

FIG. 9 is an exploded perspective view showing the two-way backlight assembly shown in FIG. 8.

Referring to FIG. 9, the two-way backlight assembly 400 includes the light source 110, the light guide part 440 for supplying the light emitted from the light source 110 to two directions different from each other, a main mold part 210 for receiving the light source 110 and light guide part 440, a receiving container 220 and a sub mold part 230.

The light guide part 440 includes the first light guide plate 410, second light guide plate 420 and reflection plate 430 disposed between the first and second light guide plates 410 and 420.

Particularly, the light emitted from the light source 110 is incident on the first and second light guide plates 410 and 420.

In this exemplary embodiment, since the reflection plate 430 is disposed between the first and second light guide plates 410 and 420, the light incident on the first light guide plate 410 is reflected from the reflection plate 430 towards the first light exit surface 412, and the light incident on the second light guide plate 420 is reflected from the reflection plate 430 towards the second exit surface 422. Thus, the light incident on the first light guide plate 410 is provided to the first direction through the first light exit surface 412, and the light incident on the second light guide plate 420 is provided to the second direction opposite to the first direction through the second light exit surface 422.

The light guide part 440 is disposed between the main mold part 210 and receiving container 220.

The receiving container 220 is provided with an opening 224 formed at a bottom surface 222 corresponding to the second light guide plate 420, so that the light exited through the second exit surface 422 of the second light guide plate 420 may be provided to the second direction through the opening 224. The opening 224 is placed at a position adjacent to the light source 110 so as to allow the light emitted from the light source 110 to be easily incident on the second light guide plate 420.

In order to prevent leakage of the light at ends of the sub mold part 230, the sub mold part 230 coupled to the opening 224 of the receiving container 220 may comprise a black-colored or/and a flat material. Also, the two-way backlight assembly 100 may further include a black-colored tape disposed between a sidewall of the sub mold part 230 and second light guide plate 420, thereby preventing leakage of the light through the ends of the sub mold part 230.

Figure 10:
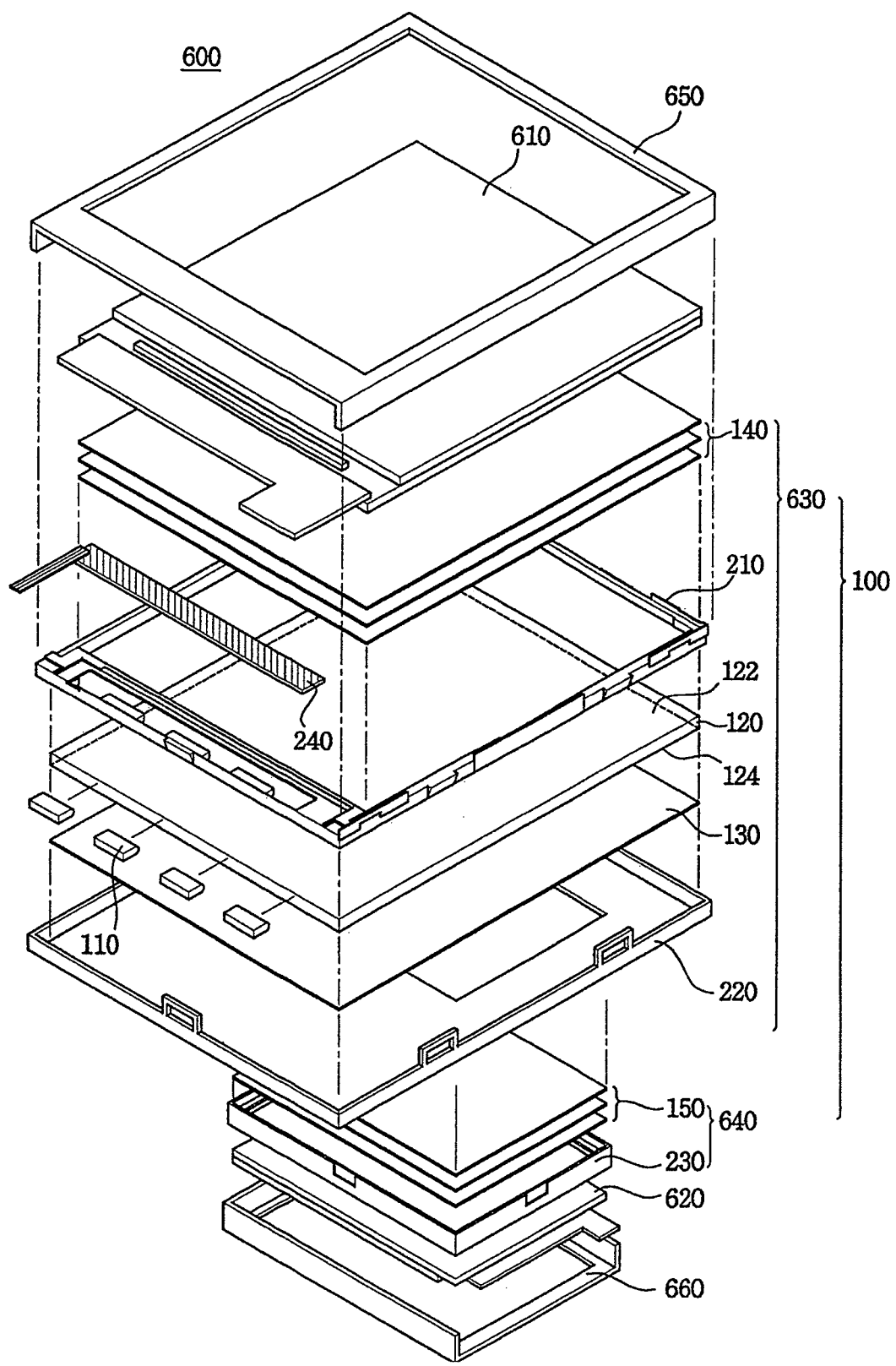
FIG. 10 is an exploded perspective view showing an LCD apparatus according to an exemplary embodiment of the present invention.

FIG. 10 is an exploded perspective view showing an LCD apparatus according to an exemplary embodiment of the present invention. In FIG. 10, the same reference numerals denote the same elements in FIG. 2, and thus the detailed descriptions of the same elements will be omitted.

Referring to FIG. 10, an LCD apparatus 600 includes a main LCD panel assembly 610, a sub LCD panel assembly 620 and a two-way backlight assembly 100.

The two-way backlight assembly 100 includes a main backlight assembly 630 and a sub backlight assembly 640.

The main LCD panel assembly 610 is disposed on the main backlight assembly 630. The main LCD panel assembly 610 receives a light supplied to a first direction through a first exit surface 122 of a light guide plate 120 and a first optical sheet 140, and displays a main image.

The sub LCD panel assembly 620 is disposed on the sub backlight assembly 640. The sub LCD panel assembly 640 receives a light supplied to a second direction through a second exit surface 124 of a light guide plate 120, a reflection/transmission sheet 130 and a second optical sheet 150, and displays a sub image.

The main LCD panel assembly 610 may have a display size equal to that of the sub LCD panel assembly 620. However, in this exemplary embodiment, the main LCD panel assembly 610 has the display size greater than that of the sub LCD panel assembly 620.

In case that the display size of the sub LCD panel assembly 620 is smaller than the display size of the main LCD panel assembly 610, the light provided to the sub mold assembly 230 may be leaked at ends of the sub mold part 230. As a result, the two-way LCD apparatus 600 may not provide an image having uniformed brightness.

In order to prevent leakage of the light through ends of the sub mold part 230, the sub mold part 230 may comprise a black-colored or/and a flat material. Also, the two-way LCD apparatus 600 may further include a black-colored tape disposed between a sidewall of the sub mold part 230 and reflection/transmission sheet 130, thereby preventing leakage of the light through the ends of the sub mold part 230.

The two-way LCD apparatus 600 may further include a main chassis 650 for preventing deviation of the main LCD panel assembly 610 from the main backlight assembly 630 and a sub chassis 660 for preventing deviation of the sub LCD panel assembly 640 from the sub backlight assembly 640. The main chassis 650 and sub chassis 660 are combined with the main mold part 210 and receiving container 220, respectively, so as to prevent deviation of the main and sub LCD panel assemblies 610 and 620.

Figure 11:
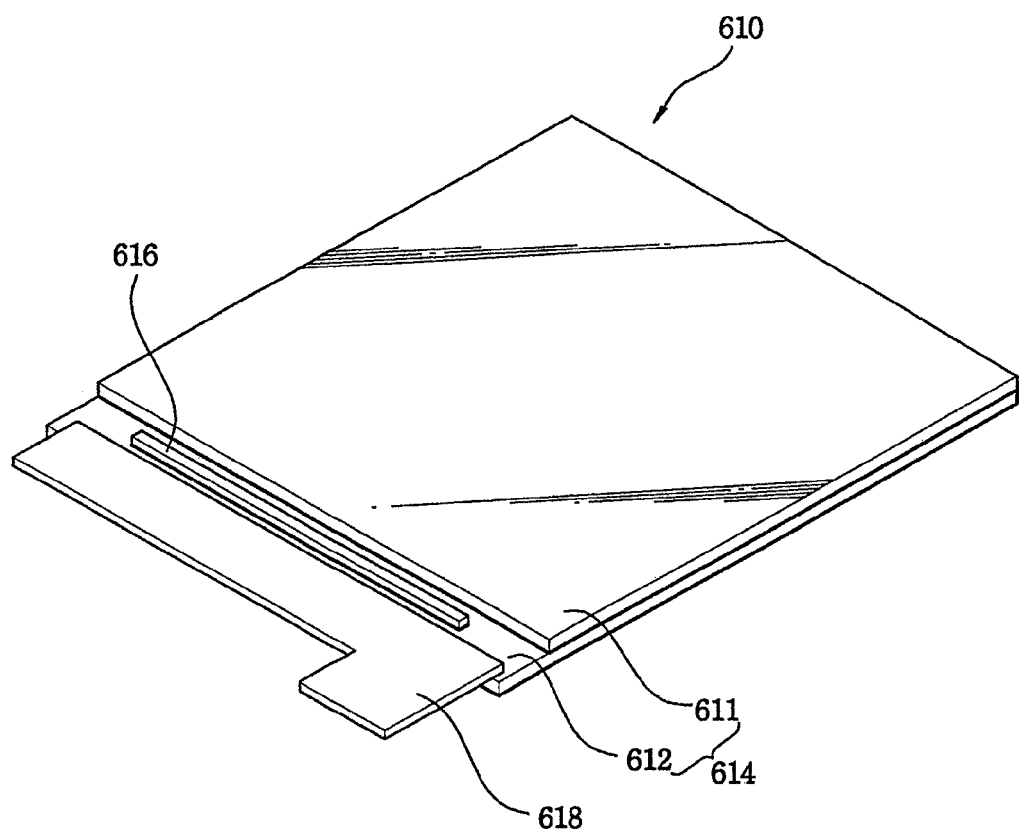
FIG. 11 is a perspective view showing the main LCD panel assembly shown in FIG. 10.

FIG. 11 is a perspective view showing the main LCD panel assembly shown in FIG. 10. In this exemplary embodiment, the sub LCD panel assembly 620 has same elements as those of the main LCD panel assembly 610, and thus a detailed description of the sub LCD panel assembly 620 will be omitted.

Referring to FIG. 11, the main LCD panel assembly 610 includes an LCD panel 614, a driving chip 616 and an FPC 618.

The LCD panel 614 includes a first substrate 611, a second substrate 612 facing the first substrate 611 and liquid crystal (not shown) disposed between the first and second substrates 611 and 612.

Particularly, a plurality of pixels is formed on the second substrate 612 in a matrix configuration. Each of the pixels is provided with a gate line extended in a first direction and a data line. The data line is insulated from the gate line, and extended in a second direction substantially perpendicular to the first direction. A thin film transistor (TFT) is formed at a pixel area defined by the gate and data lines, and electrically connected to the gate and data lines.

The second substrate 612 includes the driving chip 616 formed on one end thereof so as to apply a driving signal to the gate and data lines. The driving chip 616 may include a data line chip and a gate line chip separated from each other, and the data line chip and gate line chip may be packed into one chip. The driving chip 616 is mounted on the end of the second substrate 612 through Chip-On-Glass process (COG).

The FPC 618 is further attached to the end of the second substrate 612 so as to apply a control signal for controlling the driving chip 616. The FPC 618 may further include a timing controller for controlling a timing of the driving signal applied to the gate line and a memory for storing a data signal. The FPC 618 is electrically connected to the second substrate 612 by means of an anisotropic conductive film.

The two-way LCD apparatus 600 according to another exemplary embodiment of the present invention may supply the light to the first and second directions different from each other using the two-way backlight assembly 100 having one light source 110, one light guide plate 120 and reflection/transmission sheet 130. The light supplied to the first direction is provided to the main LCD panel assembly 610 and the light supplied to the second direction is provided to the sub LCD panel assembly 620, so that the main and sub LCD panel assemblies 610 and 620 may display the main and sub images, respectively.

According to the two-way backlight assembly and two-way LCD apparatus having the same, the two-way LCD apparatus may provide the light to two directions different from each other using only one light source, thereby reducing thickness and power consumption of the backlight assembly.

Also, although the display size of the main LCD panel assembly is different from the display size of the sub LCD panel assembly, the LCD apparatus may prevent leakage of the light through the ends of the sub mold part because the sub mold part may comprise the black-colored or/and flat material.

Although the exemplary embodiments of the present invention have been described, it is understood that the present invention should not be limited to these exemplary embodiments, but various changes and modifications can be made by one ordinary skilled in the art within the spirit and scope of the present invention as hereinafter claimed.

What is claimed is:

1. A backlight assembly comprising:
 a light source generating light;
 a light guide part including a first exit surface and a second exit surface opposite to the first exit surface, the light guide part receiving the light from the light source and emitting the received light through the first and second exit surfaces;
 a receiving container receiving the light source and light guide part, wherein the receiving container includes an opening; and
 a leakage preventing member disposed around the opening to prevent a leakage of the light.

2. The backlight assembly of claim 1, wherein the receiving container comprises a protruding portion formed at one end of the opening.

3. The backlight assembly of claim 2, wherein the leakage preventing member contacts a side of the protruding portion.

4. The backlight assembly of claim 2, wherein the leakage preventing member comprises a black-colored tape.

5. The backlight assembly of claim 2, further comprising a reflection/transmission sheet disposed on the second exit surface of the light guide part.

6. The backlight assembly of claim 2, wherein the leakage preventing member comprises a mold part including an engaging recess corresponding to the protruding portion, the mold part comprising a flat material to prevent a reflection of light.

7. The backlight assembly of claim 2, wherein the leakage preventing member comprises a mold part including an engaging recess corresponding to the protruding portion, the mold part comprising a black-colored material to prevent a reflection of light.

8. The backlight assembly of claim 1, wherein the leakage preventing member comprises a black-colored material.

9. The backlight assembly of claim 1, wherein the leakage preventing member comprises a flat material.

10. The backlight assembly of claim 1, wherein the light guide part comprises a first light guide plate including the first exit surface and a second light guide plate including the second exit surface.

11. The backlight assembly of claim 10, wherein the light guide part further comprises a reflection plate disposed between the first and second light guide plates.

12. A liquid crystal display apparatus comprising:
 a light source;
 a light guide part including a first exit surface and a second exit surface opposite to the first exit surface;
 a first liquid crystal display panel assembly disposed over the first exit surface of the light guide part;
 a receiving container receiving the light source, the light guide part, and the first liquid crystal display panel assembly, wherein the receiving container includes an opening;
 a second liquid crystal display panel assembly disposed below the opening; and
 a leakage preventing member disposed around the opening to prevent a leakage of the light.

13. The liquid crystal display apparatus of claim 12, wherein the leakage preventing member comprises a portion overlapping with the light guide part and the first and second liquid crystal display panel assembly in a vertical direction.

14. The liquid crystal display apparatus of claim 12, wherein the receiving container comprises a protruding portion formed at one end of the opening.

15. The liquid crystal display apparatus of claim 14, wherein the leakage preventing member contacts a side of the protruding portion.

16. The liquid crystal display apparatus of claim 14, further comprising a reflection/transmission sheet disposed on the second exit surface of the light guide part.

17. The liquid crystal display apparatus of claim 12, further comprising a mold part coupled to the receiving container, wherein the mold part includes a plurality of sidewalls corresponding to the opening.

18. The liquid crystal display apparatus of claim 17, wherein the leakage preventing member is partially disposed between the light guide part and the plurality of sidewalls.

19. The liquid crystal display apparatus of claim 12, wherein the leakage preventing member comprises a black-colored material.

20. The liquid crystal display apparatus of claim 12, wherein the leakage preventing member comprises a flat material.

* * * * *